Patented Oct. 16, 1928.

1,688,100

UNITED STATES PATENT OFFICE.

AUGUST WINGLER, OF ELBERFELD, NEAR COLOGNE-ON-THE-RHINE, GERMANY, ASSIGNOR TO WINTHROP CHEMICAL COMPANY, INC., OF NEW YORK, N. Y.

ISOAMYL ESTER OF THE DI-IODIDE OF BEHENOLIC ACID AND PROCESS OF PRODUCING SAME.

No Drawing. Application filed May 11, 1926, Serial No. 108,412, and in Germany May 12, 1925.

My invention relates to the hitherto unknown ester of di-iodide of behenolic acid with isoamyl alcohol. The new compound has most probably the following formula:—

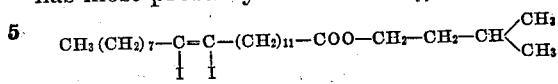

It is a useful product in medicine. It is specially suitable for subcutaneous use in view of its oily form and absence of irritation.

The process for producing the new compound consists in esterifying the di-iodide of behenolic acid or by treating with iodin or iodin furnishings substances the ester of isoamyl alcohol with behenolic acid or by treating other esters of the di-iodide of behenolic acid with isoamyl alcohol.

In order to illustrate my invention more fully the following example is given, the parts being by weight:—

One part of the di-iodide of behenolic acid is heated to 100° C. during several hours together with 4 parts of isoamyl alcohol containing 4 per cent of concentrated sulfuric acid. The reaction mass is shaken for several times with water to remove the excess of alcohol. Subsequently the ester is dissolved in ether, the ether is dried with $Na_2SO_4$ and driven off. The resulting ester recrystalizes from alcohol at 0° C. It is a limpid oil solidifying at 5-6° C.

I claim:—

1. The new isoamyl ester of the di-iodide of behenolic acid having most probably the formula:—

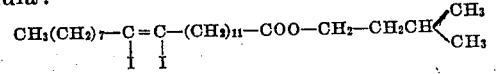

which is a limpid oil solidifying at 6° C. containing iodin and being a useful iodin preparation in medicine.

2. A process of producing the iso-amyl ester of the di-iodide of behenolic acid which comprises heating the di-iodide of behenolic acid with iso-amyl alcohol in the presence of a small amount of concentrated sulfuric acid to about 100° C. during several hours.

In testimony whereof I have hereunto set my hand.

AUGUST WINGLER.